Jan. 7, 1930. H. O. FERRING 1,742,383
RETAINING VALVE FOR AUTOMATIC STRAIGHT AIR BRAKES
Filed May 21. 1925 2 Sheets-Sheet 2
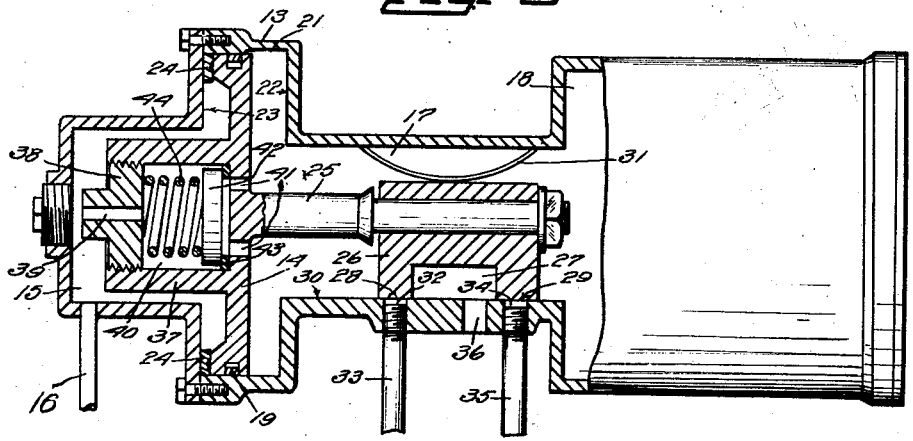
Fig. 2
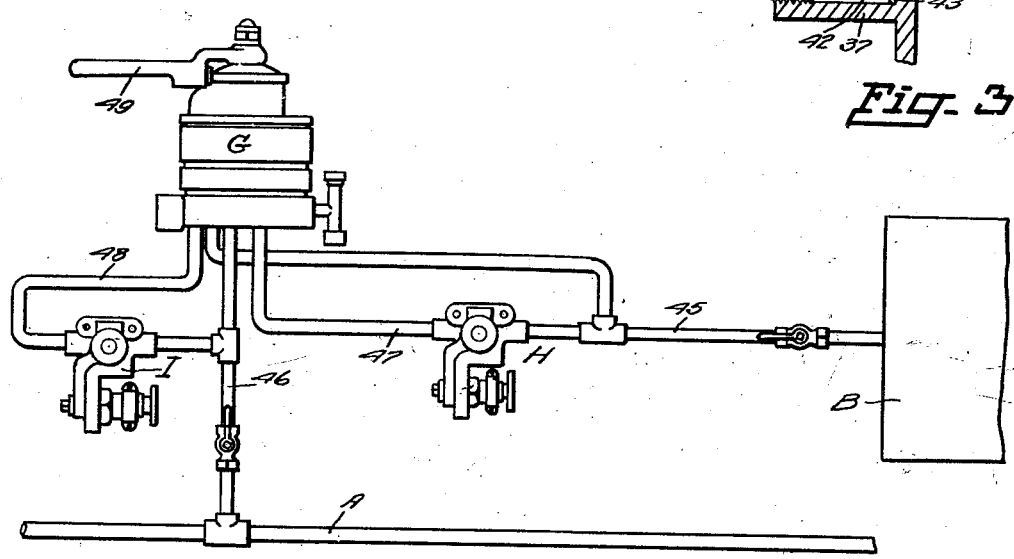
Fig. 3
Fig. 4
Inventor:
Herbert O. Ferring,
By his
Attorney,
Horace Barnes.

Patented Jan. 7, 1930

1,742,383

UNITED STATES PATENT OFFICE

HERBERT O. FERRING, OF STARBUCK, WASHINGTON

RETAINING VALVE FOR AUTOMATIC STRAIGHT AIR BRAKES

Application filed May 21, 1925. Serial No. 31,790.

This invention relates to improvements in automatic straight air-brake apparatus, and particularly to a novel form of retaining valve therefor.

The principal object of my invention is the provision of automatically actuated devices for retaining the brakes in applied position indefinitely while the auxiliary air-tank may be re-charged as many times as required with no slacking of the brakes or reduction of air pressure in the brake cylinder.

Other objects and advantages of my invention and objects relating to various applications of the invention and constructional features will be readily apparent in the course of the detailed description to follow.

The accompanying drawings illustrate by way of example one form of my invention, in which:

Fig. 2 is a view partly in plan and partly in section of my improved retaining valve, detached.

Fig. 3 is a cross-sectional fragmentary view of an element of the invention.

Fig. 4 is a view in side elevation of pipe connection elements of the invention.

Figure 1:
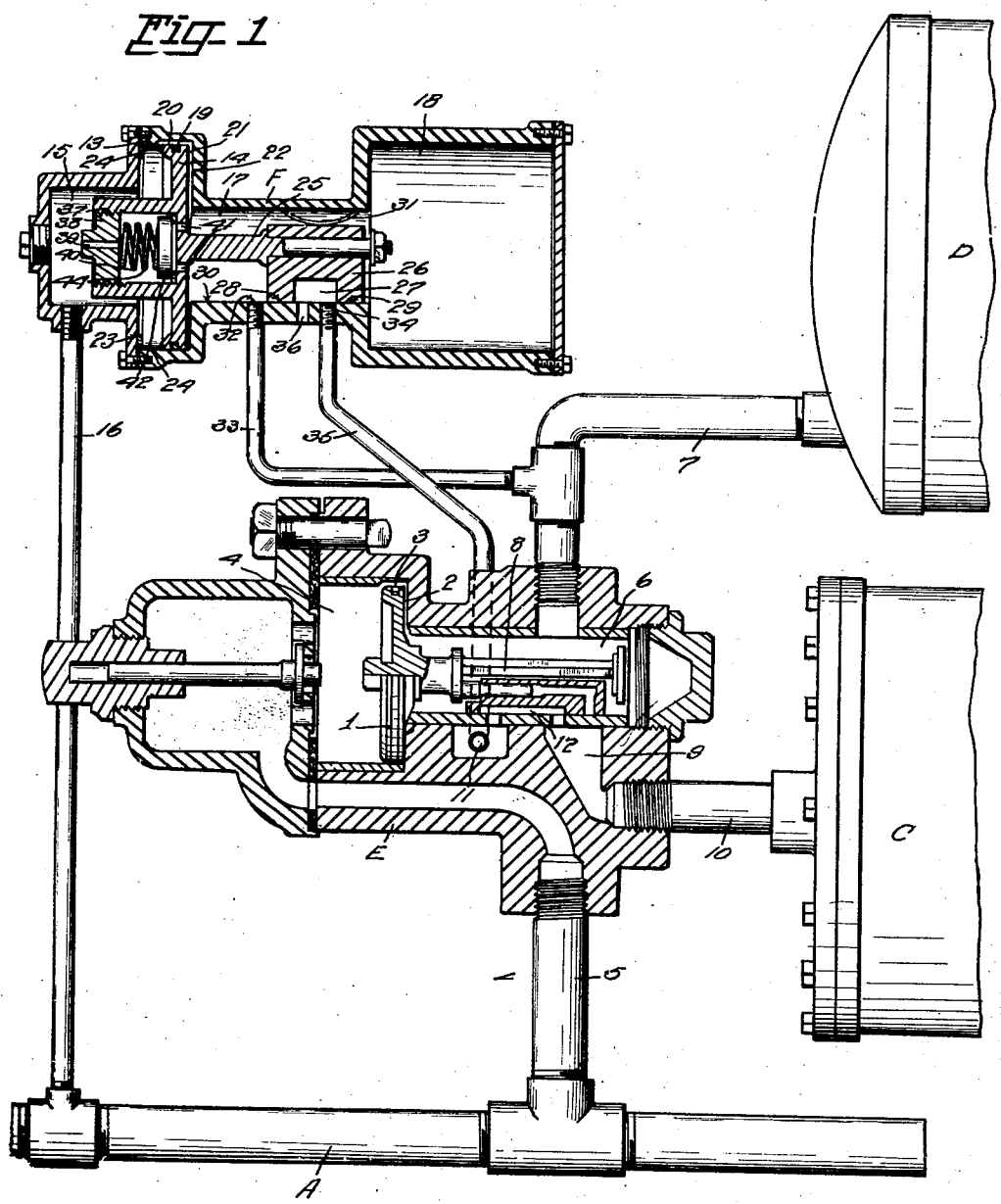
Figure 1 is a view partly in plan and partly in cross-section of apparatus embodying my invention.

Referring to said views, wherein similar reference characters indicate like parts in the several views, the reference letter A indicates the train-line pipe leading the full length of the train of cars in which air is supplied under suitable pressures from a main air-pressure reservoir B on the locomotive.

The brake-cylinder C mounted on each car through which the respective brakes (not shown) of the cars are applied is actuated by air issuing from an auxiliary air-tank D on each car as controlled by a triple-valve E.

In release position of the triple-valve mechanism, as shown in Fig. 1, the piston 1 is formed with a groove 2 co-operating with a groove 3 in the valve-body to convey the compressed air from the chamber 4 communicating with the train-line A by pipe 5 to the chamber 6 connected by pipe 7 with the auxiliary air-tank D so that the tank may be filled with air at the pressure held in the train-line.

Upon the reduction of pressure in the train-line by the engineer in making a service application of the brakes the consequent reduction of pressure in the chamber 4 will cause the piston 1 to move in said chamber in response to the unreduced pressure in chamber 6 and actuate the slide-valve 8 to admit air from the auxiliary tank into the passage 9 communicating with the brake-cylinder C by pipe 10 to operate the brakes.

In said release position of the piston 1 the triple exhaust port 11 is connected by a cavity 12 in the slide-valve with the passage 9 to exhaust the pressure in the brake-cylinder. Upon the operation of the piston to open communication between the auxiliary tank and the brake-cylinder the movement of the slide-valve closes said exhaust port 11 with respect to the passage 9 in present practice though with the use of my improved retaining valve such closure will not be necessary, as will be fully apparent hereinafter.

Adjacent the triple-valve E I provide an automatic retaining valve F consisting in a cylinder 13 in which a plunger 14 is slidably mounted. Upon one side of said plunger a chamber 15 is formed in communication with the train-line A by a pipe 16. Upon the opposite side of said plunger a reduced valve-chamber 17 is formed and in open communication therewith a larger pressure chamber 18 is provided.

The plunger is fitted with the usual piston-ring 19 and a leak-groove 20 communicating with a groove 21 in the circumferential wall of the cylinder 13 when the plunger is in seated position against the abutment wall 22 of the cylinder, as shown in Fig. 1, whereby air under pressure from the chamber 15 may pass to chambers 17 and 18 at the train-line pressures in a manner analogous to the functions of the aforedescribed grooves 2 and 3. At the opposite end of the cylinder 13 the abutment wall 23 thereof is provided with an annular gasket 24 upon which the plunger may seat in its service position, as shown in Fig. 2, to make a complete air-tight barrier between the chamber 15 and the chambers 17 and 18.

The plunger 14 is provided with a stem 25 extending axially of the chamber 17. A slide-valve 26 is mounted upon said stem formed with a cavity 27 and upon opposite sides thereof valve-faces 28 and 29 are provided in operative engagement with the circumferential wall 30 of the chamber 17 adjacent the triple-valve E. A spring 31 is provided to press said valve-faces in close sliding contact with the wall 30. A port 32 is formed in said wall communicatively connected by a pipe 33 with the auxiliary air tank D through pipe 7.

Spaced from the port 32 another port 34 is formed in wall 30 connected by pipe 35 with the exhaust port 11 of the triple-valve. Between ports 32 and 34 a port 36 is formed in the wall 30 opening into the atmosphere.

Said ports are so spaced with relation to the valve-faces 28 and 29 of the slide-valve 26 that in one of its main positions, as indicated in Fig. 1, said ports will be all uncovered with respect to the valve-faces while the ports 34 and 36 will be in communication through the cavity 27 and the port 32 will be open to the chamber 17. In the other of said main positions of the plunger, as seen in Fig. 2, the slide-valve face 28 will cover the port 32 and the face 29 will cover the port 34 closing the exhaust port 11 to the atmosphere.

The plunger 14 is formed with an integral, tubular casing 37 closed at its outer, rear end by the screw-threaded head 38 through which a bore 39 extends connecting the interior chamber 40 with the chamber 15. At the opposite, inner end of the casing apertures 41 connect chamber 40 with the chamber 17. Said apertures are normally closed by a valve-disk 42 seated upon a gasket 43 and yieldingly held thereagainst by a coil-spring 44 set at a predetermined pressure whereby a quick-release of pressure in the chambers 17 and 18 may be effected under certain conditions, as will be fully explained hereinafter.

Referring to Fig. 4, the reference letter G indicates an engineer's brake-valve of well known construction positioned in the cab of the locomotive and controlling the use of compressed air supplied from the main-reservoir B to the train-line A.

45 indicates the pipe connecting the reservoir B with the valve G giving the full pressure to the valve, and 46 is the pipe-connection between valve G and the train-line. A pipe 47 connects the reservoir B with valve G and includes therein a feed-valve H adapted to supply air thereto at a predeterminately set pressure, such pressure being the pressure normally carried in the train-line when in running condition. Another pipe 48 leads at one end to the valve G and at the other end communicates with the pipe 46 leading to the train-line and includes a feed-valve I adapted to supply air to the train-line at a predeterminately set pressure sufficiently below the pressure of the train-line when filled at said running condition to operate the brakes subsequent to the first application of the brakes.

The operation of my invention may be described as follows: Assume that the pressure maintained in the main-reservoir B is one hundred pounds per square inch, which pressure is reduced in pipe 47 by the feed-valve H to eighty pounds, at which pressure air is supplied through the valve G to the train-line A. Upon the initial service application of the brakes by the exhaustion by the engineer through exhaust devices, not shown, included in the valve G of a portion of the air pressure in train-line A, by which the train-line pressure is reduced for example from eighty pounds to seventy pounds, the pressure in chamber 4 will be reduced to like extent causing the actuation of the piston 1, as has been stated, to admit air under the original pressure of eighty pounds in the auxiliary tank D to the brake-cylinder C to apply the brakes.

Simultaneously with the air reduction in chamber 4 the air pressure will be reduced in chamber 15 of the retaining-valve F whereby the original pressure of air in chambers 17 and 18 will assert itself to move the plunger 14 in the cylinder 13 to seat against the gasket 24, as shown in Fig. 2, to move the slide-valve 26 to close the ports 32 and 34. The chamber 18 is so proportioned that the movement of the plunger 14 will reduce the pressure therein only to a point somewhat above the seventy pounds of pressure in the chamber 15, or to about seventy-two pounds, and it will retain such pressure throughout the subsequent operations of the triple-valve until re-charged by the mounting pressure in the train-line or released by the emergency operation of the quick-release mechanism contained in casing 37, as will be more fully explained.

Through said service application the air applied to the brake-cylinder will be assumed to attain a pressure of twenty-five pounds per square inch which will cause the reduction of pressure in the auxiliary tank to about seventy pounds whereupon the piston 1 will assume its lap position with the operating lever 49 of the engineer's brake-valve G set in lap position or disconnected from all outlets.

With continued running upon a downgrade more air-pressure may be required in the brake-cylinder due to leakage or other causes whereupon the engineer will exhaust an additional amount of air from the train-line again causing the actuation of the piston 1 to build up an increased amount of pressure in the brake-cylinder from the auxiliary tank. In ordinary practice such additional charging of the brake-cylinder may take place several times but with a progressing reduction of pressure in the auxiliary tank at each successive application. Repeated applications of brake pressure will result in a reduction of pressure in the auxiliary tank below a margin deemed safe by the engineer whereupon it becomes imperative to re-charge the auxiliary tank and especially without releasing the brakes. This is the particular function of my invention and is accomplished as follows.

Increased air pressure is introduced into the train-line from the main-reservoir B through the engineer connecting the pipe 45 with the pipe 48 through the valve G whereby the pressure entering the train-line is limited to approximately seventy pounds through the operation of the feed-valve I. Thus the pressure in the the train-line and chamber 15 will not exceed the pressure in chambers 17 and 18 to cause an alteration in the set position of plunger 14.

With the train-line pressure raised to seventy pounds the piston 1 will be actuated into release postion of the triple-valve, as shown in Fig. 1, whereby air from the chamber 4 will pass through grooves 2 and 3 into chamber 6 and thence into the auxiliary tank D to build up the pressure therein to seventy pounds or to as much as desirable within that amount.

In such release postion of the triple-valve the slide-valve 8 will accompany the movements of the piston and thus open the air-brake-cylinder C and passage 9 with the exhaust port 11 which would ordinarily release the brakes. Through the instrumentality of my retaining-valve devices the exhaust port 11 is blocked from leakage of air pressure by reason of the port 34 which is connected to the port 11 by pipe 35 being closed by the valve-face 29 of the slide-valve 26 whereby the air pressure is retained in the brake-cylinder though closed to the chamber 6 during the period required for re-charging the auxiliary tank.

Also it will be noted that the movement of the plunger 14 in set position, as indicated in Fig. 2, closes the port 32 and thus closes the pipe 33 so that reduction of pressure in the auxiliary tank will not cause reduction of pressure in chambers 17 and 18.

In practice with the present retaining device the engineer will re-charge the air in the auxiliary tank after about every introduction of air pressure to the brake-cylinder. He will first place the brake-valve handle 49 in service postion and after drawing off the desired amount of air reducing the train-line pressure about eight or ten pounds he will place the handle in lap position until the exhaust valve portion of the retaining-valve closes. He then places the brake-valve handle in holding postion where the pipe 45 is communicatively connected to the pipe 48 whereby pressure not to exceed seventy pounds will be supplied to the train-line.

It will be noted that in all applications of air pressure to the train-line, excepting where brakes are to be released, the engineer will utilize the pipe 48 to supply the additional air. Such pipe includes the feed-regulating valve I which is set at seventy pounds and therefore the apparatus is automatically guarded against accidental increase of train-line pressure above seventy pounds which would cause the displacement of the plunger 14 and the opening of the ports 32 and 34 with a release of the brakes by exhaustion of the air through ports 11, 34 and 36 to the atmosphere.

To release the brakes the engineer will place the brake-valve mechanism in full release position to open the train-line to the full pressure of the main air reservoir B through connecting pipes 45 and 46, building up the pressure in the train-line to eighty pounds or more. Such pressure will cause the piston 1 and plunger 14 to act and set in their full release positions, as shown in Fig. 1. The slide-valve 26 will be moved with the plunger and connect the ports 34 and 36 through the cavity 27 whereby the pressure in the brake-cylinder will exhaust through the passage 9 and into the cavity 12 to the port 11 and thence through pipe 35 to exhaust to the atmosphere through the port 36 to release the brakes.

As the slide-valve 26 moves over with the plunger the valve-face 28 will uncover the port 32 which communicates by pipe 33 and pipe 7 with the auxiliary tank. The pressure in the tank D owing to its larger capacity will not build up as quickly as that in the chambers 17 and 18 hence back pressure in said chambers will be relieved by the escape of air through the port 32 to bring the plunger forward more quickly and admit of the pressures in said chambers and in the tank D being built up together to train-line pressure.

After the brakes are fully released the engineer will set his brake-valve G to running position which will connect the pipe 47 with the pipe 46 maintaining a normal pressure of eighty pounds in the train-line through the functioning of the feed-regulating valve H which is set at eighty pounds.

In the event that the pressure in the train-line is reduced to an extraordinary extent, as when a large leak develops or in breaking up a train to cut out certain cars, the brakes could not be released in the remaining cars of the train until the pressure in the train-line had been built up again to overcome the pressure in chambers 17 and 18. To overcome this difficulty and to provide a quick-release of the brakes at an early stage in the building up of the air pressure I provide the quick-release mechanism included in the casing 37.

As has been stated, the spring 44 exerts a tension upon the valve-disk 42 at a predetermined extent, presumably at twenty-five pounds. The normal difference of pressure between chambers 15 and 17 during application of the brakes is from ten to twelve pounds, that is to say, the pressure in the chambers 17 and 18 will be about seventy-two pounds per square inch while the pressure in the chamber 15 will vary from fifty-five to nearly seventy pounds and this pressure must be increased to over seventy-two pounds before the brakes may be released.

Such normal difference will not affect the quick-release mechanism. But if for any reason the pressure in chamber 15 should be reduced to more than twenty-five pounds less than that in chambers 17 and 18 the spring 44 will yield to allow the lifting of the disk 42 and the escape of air from chamber 17 through the apertures 41 and bore 39 to the chamber 15 until a balance of twenty-five pounds differential is established. In this manner the difference in pressures between chambers 15 and 17 can not be more than twenty-five pounds. For example, the pressure in the train-line may be entirely exhausted while the pressure in chambers 17 and 18 is reduced to twenty-five pounds of pressure through the escape of air therefrom as just described. It will only be necessary to raise the pressure in the train-line to twenty-five pounds or slightly over to actuate the plunger 14 and release the brakes instead of to the full initial pressure of somewhat over seventy-two pounds which would have been the case without the aid of such quick-release.

It is desirable to have the plunger 14 somewhat larger in diameter than the piston 1 so that it will be somewhat more sensitive and act more quickly than the piston, to close the exhaust port and open the same in advance of the movements of the piston so that actual setting of the brakes and their release will be performed more quickly than at the present time.

The present illustrated embodiment of my invention is one adapted to be applied to brake equipment now in use. In new installations it will be apparent that the novel retaining devices may be incorporated in a structure forming an integral part of the triple-valve body-casing to make a compact and homogeneous construction.

Particular advantages residing in my invention are: it maintains and increases the pressure of air in the brake-cylinder after the first application thus holding a large reserve of pressure in the auxiliary tank which is especially advantageous on long, heavy grades; overcomes and compensates for the leakage of air in a long train of cars after the brakes are applied; makes it possible to maintain pressures in proportions of sixty-five pounds or more in the brake-cylinder at the same time the train-line pressure is based at about seventy pounds; will save loss of equipment in train-line hose by the train-line pressure being held to relatively low pressures at all times; all of the emergency feathres of any type of triple-valve are unaffected by the use of the present retaining-valve; and reduces the present type of triple-valve to the function of charging the brake-cylinder and auxiliary tank while my improved apparatus takes care of the release of the brakes.

From the foregoing description taken in connection with the accompanying drawings the advantages of the construction and operation of my retaining-valve will be readily apparent but, while I have described the principle of operation of the invention together with the device which I now consider to be the best embodiment thereof, it will be understood that the structure shown is merely illustrative and that such changes may be made therein as are within the scope of the following claims.

What I claim, is:

1. Air-brake apparatus, consisting in a main air pressure reservoir, a train-line pipe, a pipe connection from said reservoir, a pipe connection from said reservoir including a feed-regulating valve set at running train-line pressure, a pipe connection to said train-line pipe including a feed-regulating valve set at a pressure below that of the first named regulating-valve, a controlling brake-valve adapted to selectively connect said pipe connections with the train-line pipe, a brake-cylinder, a triple-valve operatively connected thereto and with the train-line, an auxiliary tank connected with the triple-valve a retaining-valve formed with a chamber having connections with the train-line, a pressure chamber, a plunger between said chambers, means to build up the pressure in the pressure chamber when said plunger is in release position, an exhaust port connecting said pressure chamber with the exhaust opening of the triple-valve, a port in the retaining valve communicating with the atmosphere, a port in said pressure chamber connecting with said auxiliary tank, and a slide-valve connected to said plunger closing said exhaust port and said auxiliary tank port when in retaining position and opening said ports and connecting the exhaust port and the atmospheric port in its opposite release position.

2. Air-brake apparatus, consisting in a main air pressure reservoir, a train-line pipe, a pipe connection from said reservoir, a pipe connection from said reservoir including a feed-regulating valve set at running train-line pressure, a pipe connection to said train-line pipe including a feed-regulating valve set at a pressure below that of the first named regulating-valve, a controlling brake-valve adapted to selectively connect said pipe connections with the train-line pipe, a brake-cylinder, a triple-valve operatively connected thereto and with the train-line, an auxiliary tank connected with the triple-valve, a retaining-valve formed with a chamber having connections with the train-line, a pressure chamber, a plunger between said chambers seating in air-tight condition in retaining position when the train-line pressure is reduced, means to build up the pressure in the pressure chamber when said plunger is in opposite release position, an exhaust port connecting said pressure chamber with the exhaust opening of the triple-valve, a port in the retaining-valve communicating with the atmosphere, a port in said pressure chamber connecting with said auxiliary tank, and a slide-valve operative with said plunger closing said exhaust port and said auxiliary tank port when in retaining position and opening said ports and connecting the exhaust port and the atmospheric port in its opposite release position.

3. Air-brake apparatus, consisting in a main air pressure reservoir, a train-line pipe, a pipe connection from said reservoir, a pipe connection from said reservoir including a feed-regulating valve set at running train-line pressure, a pipe connection to said train-line pipe including a feed-regulating valve set at a pressure below that of the first named regulating-valve, a controlling brake-valve adapted to selectively connect said pipe connections with the train-line pipe, a brake-cylinder, a triple-valve operatively connected thereto and with the train-line, an auxiliary tank connected with the triple-valve, a retaining-valve formed with a chamber having connections with the train-line, a pressure chamber, a plunger between said chambers seating in air-tight condition in retaining position when the train-line pressure is reduced, means to build up the pressure in the pressure chamber when said plunger is in opposite release position, an exhaust port connecting said pressure chamber with the exhaust opening of the triple-valve, a port in the retaining-valve communicating with the atmosphere, a port in said pressure chamber connecting with said auxiliary tank, a slide-valve operative with said plunger closing said exhaust port and said auxiliary tank port when in retaining position and opening said ports and connecting the exhaust port and the atmospheric port in its opposite release position, and means to release a portion of the pressure in said pressure chamber upon the reduction of pressure in the train-line below a predetermined differential.

4. Air-brake apparatus, including a train-line pipe, means to supply air pressure thereto, means to supply air to said pipe at pressures below the running pressure subsequent to the initial service application of the brakes, a brake-cylinder, a triple-valve operatively connected thereto, and with said train-line pipe, an auxiliary tank connected with the triple-valve, a retaining-valve formed with a chamber having connections with the train-line, a pressure chamber, a plunger between said chambers seating in air-tight condition in retaining position when the train-line pressure is reduced, means to build up the pressure in the pressure chamber when said plunger is in opposite release position, an exhaust port connecting said pressure chamber with the exhaust opening of the triple-valve, a port in the retaining-valve communicating with the atmosphere, a port in said pressure chamber connecting with said auxiliary tank, and a slide-valve operative with said plunger closing said exhaust port and said auxiliary tank port when in retaining position and opening said ports and connecting the exhaust port and the atmospheric port in its opposite release position.

5. Air-brake apparatus, including a train-line pipe, means to supply air pressure thereto, means to supply air to said pipe at pressures below the running pressure subsequent to the initial service application of the brakes, a brake-cylinder, a triple-valve operatively connected thereto, and with said train-line, an auxiliary tank connected with the triple-valve, a retaining-valve formed with a chamber having connections with the train-line, a pressure chamber, a plunger between said chambers seating in air-tight condition in retaining position when the train-line pressure is reduced, means to build up the pressure in the pressure chamber when said plunger is in opposite release position, an exhaust port connecting said pressure chamber with the exhaust opening of the triple-valve, a port in the retaining-valve communicating with the atmosphere, a port in said pressure chamber connecting with said auxiliary tank, a slide-valve operative with said plunger closing said exhaust port and said auxiliary tank port when in retaining position and opening said ports and connecting the exhaust port and the atmospheric port in its opposite release position, and means to release a portion of the pressure in said pressure chamber upon the reduction of pressure in the train-line below a predetermined differential.

6. In air-brake apparatus, a train-line supplied with air under pressure, a brake-cylinder, an auxiliary tank, a triple-valve controlling the passage of air to said auxiliary tank from the train-line and the passage of air from the auxiliary tank to the brake-cylinder, and a retaining-valve controlling the exhaust of air from the brake-cylinder, said retaining-valve including a chamber open to the train-line, a pressure chamber, a cylinder between said chambers, a plunger operative in said cylinder to two positions, retaining position wherein the pressure chamber is sealed from ingress of air and release position wherein air pressure from the train-line may pass into said pressure, ports in said pressure chamber connecting, respectively, with said exhaust from the brake-cylinder, to the atmosphere, and to said auxiliary tank, and a slide-valve connected to said plunger and in retaining position of the plunger closing all of said ports from the pressure chamber and in release position opening port to the auxiliary tank for communication with the pressure chamber and connecting the exhaust port with the atmospheric port.

7. In air-brake apparatus, a main pressure reservoir, a train-line pipe, a pipe connection from said reservoir including a feed-regulating valve set at running train-line pressure, a pipe connection to said train-line pipe including a feed-regulating valve set at a pressure below that of the first named regulating-valve, and a controlling brake-valve into which all of said pipes extend.

8. In air-brake apparatus, the combination a triple-valve, an auxiliary tank therefor, and a retaining-valve, said retaining-valve having a pressure-chamber therein, and a plunger actuated and retained by the pressure in said pressure-chamber to close communicative connections between said pressure-chamber and the triple-valve and with the auxiliary tank.

9. In air-brake apparatus, the combination with a triple-valve and an auxiliary tank therefor, of a retaining-valve including a pressure-chamber therein, communicative connections between said chamber and the triple-valve and with said auxiliary tank, means to charge said auxiliary tank to train-line pressure, a plunger in said retaining-valve operative over the pressure in said pressure-chamber when the train-line pressure is reduced, including a valve closing said communications to the exhaust-valve and to the auxiliary tank.

10. In air-brake apparatus, a triple-valve including an exhaust port for a brake-cylinder and an auxiliary tank to supply air under pressure to said triple-valve, a retaining-valve having a pressure-chamber and plunger actuated by the pressure therein when the pressure in the train-line is reduced, said retaining-valve having a port communicating with said exhaust port and a port communicating with said auxiliary tank, and a slide-valve operable with the plunger to close said retaining-valve port.

11. In air-brake apparatus, a retaining-valve consisting in a cylinder having a plunger therein, communicative connections upon one side of said plunger with the train-line, a pressure-chamber upon the opposite side of said plunger, a port in said chamber communicatively connected with a triple-valve, a port communicatively connected with an auxiliary tank, and a valve connected to said plunger arranged to close said ports simultaneously when said plunger is actuated by pressure within said pressure-chamber.

12. In air-brake apparatus, a retaining-valve consisting in a cylinder having a plunger therein, communicative connections upon one side of said plunger with the train-line, a pressure-chamber upon the opposite side of said plunger, a port in said chamber communicatively connected with a triple-valve, a port communicatively connected with an auxiliary tank, a valve connected to said plunger arranged to close said ports simultaneously when said plunger is actuated by pressure within said pressure-chamber, and a relief-valve mounted in said plunger.

HERBERT O. FERRING.